United States Patent [19]

Auld, Jr. et al.

[11] Patent Number: 5,257,396
[45] Date of Patent: Oct. 26, 1993

[54] DUAL IN-BAND/OUT-OF-BAND CATV SYSTEM

[75] Inventors: Frederick H. Auld, Jr., Barrington; Michael E. Long, Oakbrook; Larry K. Moreland, McHenry, all of Ill.

[73] Assignee: Zenith Electronics Corporation, Glenview, Ill.

[21] Appl. No.: 761,106

[22] Filed: Sep. 17, 1991

[51] Int. Cl.⁵ .................................... H04B 17/00
[52] U.S. Cl. .......................... 455/2; 455/6.2; 358/84; 358/86
[58] Field of Search ............ 358/86, 181, 84; 455/3.3, 6.1, 6.2, 6.3, 2

[56] References Cited

U.S. PATENT DOCUMENTS

| | | | |
|---|---|---|---|
| 3,869,564 | 3/1975 | Colodny | 358/86 |
| 4,015,074 | 3/1977 | Inoue et al. | 358/86 |
| 4,427,995 | 1/1984 | Naito | 358/86 |
| 4,507,680 | 3/1985 | Freeman | 358/86 |
| 4,523,190 | 6/1985 | De Roo | 258/86 |
| 4,527,194 | 7/1985 | Sirazi | 358/86 |
| 4,558,464 | 12/1985 | O'Brien, Jr. | 358/86 |
| 4,677,685 | 6/1987 | Kurisu | 358/86 |
| 4,716,410 | 12/1987 | Nozaki | 358/86 |
| 5,091,937 | 2/1992 | Kawasaki | 358/86 |

Primary Examiner—Reinhard J. Eisenzopf
Assistant Examiner—Timothy H. Keough

[57] ABSTRACT

A dual in-band/out-of-band CATV receiver includes a coupler that couples input signals to a tuner and decoder for demodulation and recovery of in-band data and to an FSK receiver for recovery of out-of-band data. The recovered data outputs of the decoder and of the FSK receiver are coupled to a data switch that has a common output that is coupled to a tuner/decoder microprocessor. The tuner/decoder microprocessor in turn supplies information to a switch microprocessor for controlling operation of the data switch to couple either in-band or out-of-band data to the tuner/decoder microprocessor. The data switch defaults to the in-band data position whenever a channel change occurs.

7 Claims, 1 Drawing Sheet

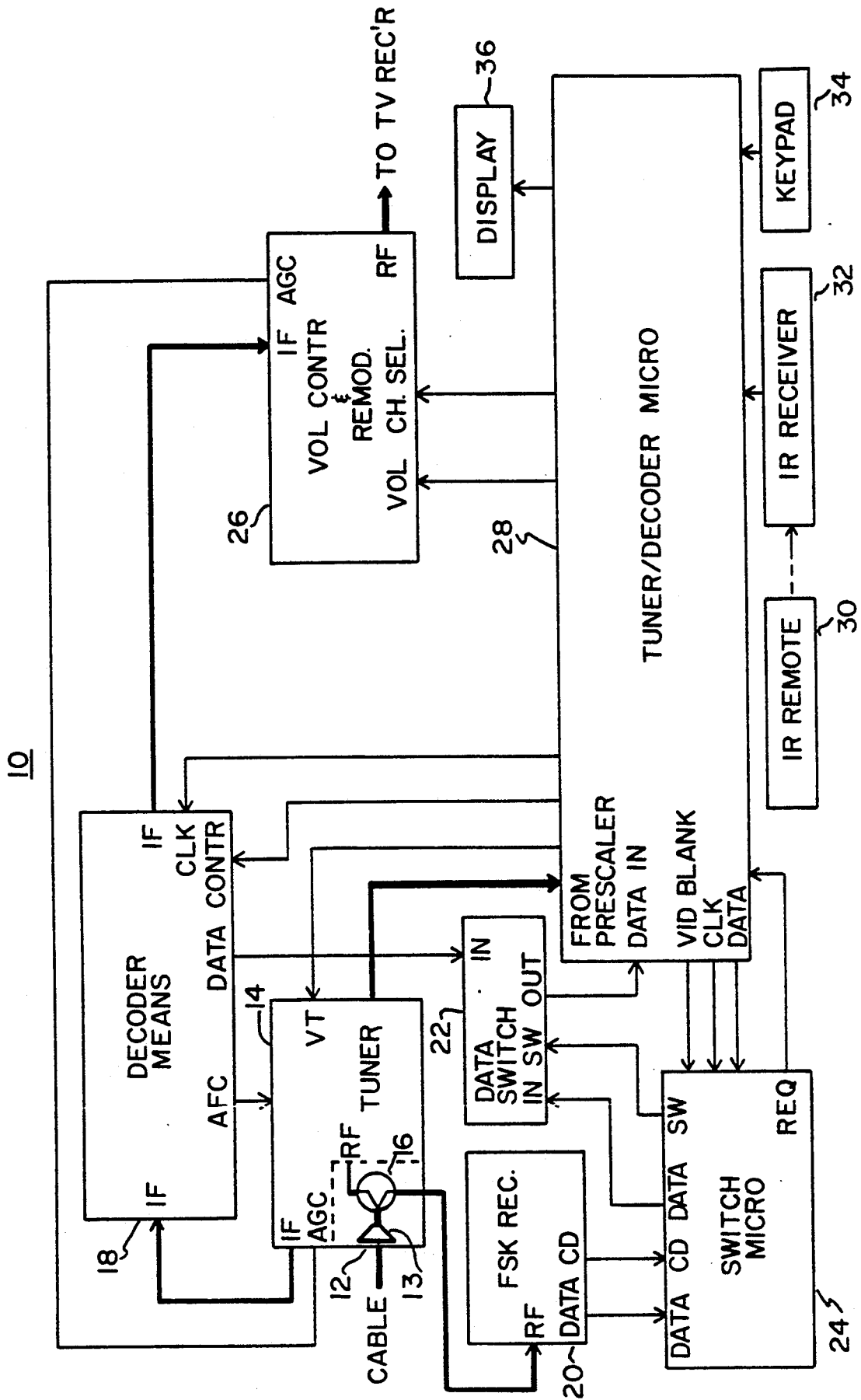

DUAL IN-BAND/OUT-OF-BAND CATV SYSTEM

BACKGROUND OF THE INVENTION AND PRIOR ART

This invention relates generally to cable antenna television (CATV) systems and particularly to a cable signal decoder for such a system that may be used with both cable television systems having in-band data and cable systems having out-of-band data.

Cable systems are generally categorized into in-band and out-of-band data types. The in-band type generally sends data in the vertical blanking interval of the television signal, by modulation of the horizontal sync interval, or via the audio subcarrier of the channel signal. Out-of-band systems utilize a separate carrier signal that is outside of the television frequency spectrum to send data. The data is usually sent in the form of a frequency shift keyed (FSK) carrier. The advantage of an out-of-band system is that a cable system decoder unit may be addressed at any time, irrespective of the channel to which it is tuned. The disadvantage is the added cost of the special receiver for recovering the out-of-band data and the low level of security against "trapping out" addressable data. The advantage of an in-band data system is its economy and higher level of protection for data. The disadvantage is that the subscriber decoder unit must be tuned to an in-band data channel before the cable head-end can communicate with the decoder unit. Both forms of data transmissions are commonly used in cable television systems. Accordingly, it would be advantageous to provide a CATV receiver that has the capability of operating with cable systems having in-band data as well as with systems having out-of-band data to enhance service flexibility and minimize obsolescence. It would also be advantageous to have a dual system where certain data would be sent in-band for security and other data sent out-of-band for communication efficiency.

OBJECTS OF THE INVENTION

A principal object of the invention is to provide a novel CATV receiver.

Another object of the invention is to provide a CATV receiver that is capable of recovering both in-band and out-of-band data.

A further object of the invention is to provide a CATV receiver that is automatically operated to recover out-of-band data if no in-band data is received.

BRIEF DESCRIPTION OF THE DRAWING

These and other objects and advantages of the invention will be apparent upon reading the following description in conjunction with the drawing, the single figure of which is a partial block diagram of a dual in-band/out-of-band CATV receiver constructed in accordance with the invention.

DESCRIPTION OF THE PREFERRED EMBODIMENT

Referring to the single figure of the drawing, a CATV receiver, constructed in accordance with the invention, is generally indicated by the reference numeral 10. The receiver includes a cable input terminal 12 for receiving the full spectrum of cable television signals as well as any signal carriers conveying out-of-band data. Cable input terminal 12 communicates with a tuner 14 that includes a separate amplifier 13 that is AGC controlled and a directional coupler 16 which divides input signals into first and second portions. One portion is supplied to the operative portions of tuner 14 where it is demodulated and converted to an IF signal that is applied to a decoder means 18 in accordance with well known techniques. Decoder means 18 is of conventional construction and includes means (not shown) for recovering in-band data, which may be carried in the vertical blanking interval, sent as modulation of the horizontal sync intervals or of the audio subcarrier in the received television signal. The second RF signal is coupled to an FSK receiver 20 where data is recovered in accordance with conventional detection methods for FSK carrier signals. It will be appreciated that any other form of modulation may be used rather than FSK as illustrated. Such forms may be AFSK, PSK, QAM, etc. The recovered data from FSK receiver 20 is coupled to a switch microprocessor 24 along with a carrier detect (CD) signal. Switch microprocessor 24 also reformats the recovered data from FSK receiver 20 into a data format similar to that of the in-band data and one that is compatible with the data input part of a tuner/decoder microprocessor 28. A data switch 22 includes two data inputs, one coupled to switch microprocessor 24 and another to the in-band data output of decoder means 18, and a single data output. Additionally, data switch 22 includes a switch input (SW) that is driven from switch microprocessor 24.

A block 26, labelled volume control and remodulator, receives the IF signal from decoder means 18 and is intercoupled with the tuner/decoder microprocessor 28 which develops a tuning voltage (VT) for tuner 14, controls decoder means 18, interprets data from data switch 22 and controls the volume and remodulation of baseband signals received from decoder means 18. These elements are all well known in the art and need not be described in detail. Tuner/decoder microprocessor 28 is in turn coupled to and controlled by an IR receiver 32 which receives signals from a remote unit 30 and from a keypad 34 for the direct entry of control commands. A display 36, indicating channel number and the like, is coupled to tuner/decoder microprocessor 28.

The inventive portion of the CATV receiver 10 centers about data switch 22 and the inclusion of both decoder means 18 and FSK receiver means 20. In operation, signals at input terminal 12 are amplified by amplifier 13 and split by directional coupler 16 with a first portion of the input signal being applied to tuner 14 and recovered by decoder means 18 along with any in-band data and a second portion being applied to FSK receiver means 20 where any out-of-band carrier frequency is recovered from the input signal. The cable television signal is decoded and demodulated conventionally by decoder means 18 and applied to volume control and remodulator 26 where it is remodulated onto a selected RF carrier for coupling to a television receiver (not shown). The data, whether in-band or out-of-band, is recovered by either decoding means 18 or FSK receiver 20 and applied via data switch 22 to tuning microprocessor 28 for controlling the operation of decoder means 18 in a well known manner. Tuner/decoder microprocessor 28 also generates video blanking information and clock information for CATV receiver 10. A serial data line from tuner/decoder microprocessor 28 is connected to switch microprocessor 24 to enable the latter to periodically request the status of the tuner/decoder microprocessor 28 and to receive information via the data line. Whenever a channel change occurs, switch microprocessor 24 defaults the data switch 22 to a position where any in-band data from decoder means 18 is coupled to the data output terminal. A request from switch microprocessor 24 to tuner/decoder microprocessor 28 yields an indication of whether any in-band data is being received by tuner/decoder microprocessor 28. A no data response to the request from switch microprocessor 24 indicates that the tuned cable channel signal does not have in-band data and the switch microprocessor 24 operates the data switch 22 to the position where data translated from the data recovered from FSK receiver 20 is coupled to tuner/decoder microprocessor 28. Therefore, if a tuned television channel includes in-band data, that data is recovered by decoder means 18. If the tuned television channel does not contain in-band data, the switch microprocessor 24 operates the data switch to the out-of-band data position for recovery of out-of-band data should there be any available. In this way, the CATV receiver is capable of receiving both in-band and out-of-band data whenever data is available. The system is seen to provide the data security of in-band communication when a receiver is tuned to an in-band data channel and the rapid communication advantages whenever the receiver is not tuned to an in-band data channel.

The default position of data switch 22 is of course optional and the out-of-band data position, corresponding to FSK receiver 20, could be the default position of the data switch with equal facility. The key is that both in-band and out-of-band data are checked to assure that the data being transmitted is recovered by the CATV receiver of the invention.

What is claimed is:

1. A cable television signal decoder having a cable input comprising:
   first means, coupled to said cable input, for recovering data encoded in a cable television channel signal;
   second means, coupled to said cable input, for recovering data received independent of cable television channel signals;
   a data switch for selectively coupling recovered data from said first means and from said second means to a data output; and
   control means for operating said data switch in response to recovered data from one of said first and said second means.

2. The decoder of claim 1 wherein said control means comprises microprocessor means for controlling tuning of said cable television signals and for receiving recovered data from said data output.

3. The decoder of claim 1 wherein said control means comprises a television channel tuning and decoding microprocessor that receives information from said data output.

4. The decoder of claim 3, further including a switch microprocessor for interrogating said television channel tuning and decoding microprocessor each time a cable television channel signal is tuned for determining whether in-band data accompanies the tuned cable television channel signal and for operating said data switch to couple said second means to said data output when in-band data does not accompany the tuned cable television channel signal.

5. The decoder of claim 4, further including means coupled between said cable input and said first and said second means for applying input signals at said cable input to both said first means and said second means, said second means including an FSK receiver coupled to said switch microprocessor.

6. A CATV receiver comprising:
   a cable input;
   coupling means connected to said cable input for developing first and second signals from television signals with in-band or out-of-band data at said cable input;
   decoder means coupled to said coupling means for recovering any in-band data from said first signal;
   FSK receiver means coupled to said coupling means for recovering any out-of-band data from said second signal;
   a data switch having a first input coupled to said decoder means, a second input coupled to said FSK receiver means and a data output terminal, said data switch selectively coupling said data output terminal to one of said first and said second inputs; and
   microprocessor means for tuning cable television channel signals in said first signal and for receiving data from said data output terminal, said microprocessor means including control means for operating said data switch to selectively couple recovered data from said decoder means and from said FSK receiver means to said data output terminal, said microprocessor means operating said data switch to couple said in-band data from said decoder means whenever a television channel change occurs.

7. The receiver of claim 6 wherein said microprocessor means operates to coupled said out-of-band data from said FSK receiver means whenever in-band data is not being received.

* * * * *